(12) United States Patent
Otani

(10) Patent No.: US 11,022,812 B2
(45) Date of Patent: Jun. 1, 2021

(54) LIGHT EMITTING DEVICE AND IMAGE DISPLAY SYSTEM

(71) Applicant: SEIKO EPSON CORPORATION, Tokyo (JP)

(72) Inventor: Makoto Otani, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 66 days.

(21) Appl. No.: 16/548,927

(22) Filed: Aug. 23, 2019

(65) Prior Publication Data

US 2020/0064646 A1 Feb. 27, 2020

(30) Foreign Application Priority Data

Aug. 24, 2018 (JP) .............................. JP2018-157000

(51) Int. Cl.
| | |
|---|---|
| *F21V 5/04* | (2006.01) |
| *G02B 5/02* | (2006.01) |
| *G03B 21/134* | (2006.01) |
| *G02B 27/30* | (2006.01) |
| *G02B 5/10* | (2006.01) |
| *G03B 21/14* | (2006.01) |
| *G03B 17/56* | (2021.01) |

(52) U.S. Cl.
CPC ................ *G02B 27/30* (2013.01); *F21V 5/04* (2013.01); *G02B 5/10* (2013.01); *G03B 17/565* (2013.01); *G03B 21/142* (2013.01)

(58) Field of Classification Search
CPC ....... F21V 5/04; G02B 5/0215; G02B 5/0257; G02B 5/0278; G02B 27/0961; G02B 27/30; G03B 21/134; G03B 17/565; G06F 3/0425; G06F 3/0421
See application file for complete search history.

(56) References Cited

U.S. PATENT DOCUMENTS

| | | | |
|---|---|---|---|
| 2015/0116216 A1 | 4/2015 | Sakai et al. | |
| 2019/0220103 A1* | 7/2019 | Otani | ................... G03B 21/208 |

FOREIGN PATENT DOCUMENTS

JP   2015-111385 A   6/2015

* cited by examiner

*Primary Examiner* — Ryan D Howard
(74) *Attorney, Agent, or Firm* — Dority & Manning, P.A.

(57) ABSTRACT

A light emitting device is provided with a first light emitter and a second light emitter. The first light emitter is provided with a first lens for making the light of the first light source wide-angle, and the second light emitter is provided with a second lens for making the light of the second light source wide-angle. The cover lens tilted with respect to a projection surface and disposed downstream of the first lens and the second lens has a curved surface shape, and the curvature center of the cover lens is different in position from a first diffusion center to be a starting point from which the first light is made wide-angle, and a second diffusion center to be a starting point from which the second light is made wide-angle.

20 Claims, 12 Drawing Sheets

LIGHT EMITTING DEVICE AND IMAGE DISPLAY SYSTEM

The present application is based on, and claims priority from JP Application Serial Number 2018-157000, filed Aug. 24, 2018, the disclosure of which is hereby incorporated by reference herein in its entirety.

BACKGROUND

1. Technical Field

The present disclosure relates to a light emitting device and an image display system equipped with the light emitting system.

2. Related Art

In JP-A-2015-111385 (Document 1), there is disclosed an image display system which detects the position of a pointing body such as a pen operated on a display surface such as a screen on which an image is displayed or a finger, and performs display or an operation corresponding to a trajectory of the pointing body. The image display system in Document 1 is provided with a projector and a light emitting device for emitting light along a projection surface (a display surface) on which the projector performs the projection, and creates a light curtain which covers the projection surface with the light emitted from the light emitting device. The projector detects the position of the pointing body based on reflection of the light by the pointing body operated on the projection surface, and then performs the projection based on the detection result.

The light emitting device in Document 1 is provided with a light emitter and a housing. The light emitter is provided with a light source, a collimator as a lens for substantially collimating the light emitted from the light source, and a directional lens for making the light in a direction (a first direction) along the projection surface wide-angle out of the light substantially collimated by the collimator. In Document 1, a Powell lens is used as the directional lens. The Powell lens has a convex shape on the light incidence side and a flat shape on the light exit side when viewed from a second direction perpendicular to the first direction, and has a rectangular shape when viewed from the first direction.

When performing the position detection of the pointing body operated on the projection surface using the light curtain covering the projection surface, the shorter the distance between the light curtain and the projection surface is, the higher the operability is. When installing the light emitting device above the projection surface, in order to improve the operability in a lower area of the projection surface, the light is emitted obliquely downward toward the lower part of the projection surface to form the light curtain tilted with respect to the projection surface. Thus, it is possible to make the light curtain closer to the projection surface in the lower area of the projection surface.

However, in an upper part of the projection surface, there is a limitation when attempting to shorten the distance between the emission position of the light from the light emitting device and the projection surface. Therefore, in the upper area of the projection surface, the distance between the light curtain and the projection surface becomes long, and therefore, there is a possibility of making mistaken perception that the pointing body has contact with the projection surface despite the pointing body does not have contact with the projection surface, and thus, there is a problem that the operability is poor.

SUMMARY

The present disclosure has an advantage of preventing the deterioration of the operability in the touch operation due to the fact that the light emitted from the light emitting device and the display surface are away from each other.

A light emitting device according to an aspect of the present disclosure includes a light source, a collimator configured to substantially collimate light emitted from the light source with respect to an optical axis of the light source, an lens configured to make light emitted from the collimator wide-angle with respect to a first direction different from the optical axis from a first diffusion center as a starting point, and a cover lens having a curved surface shape and disposed downstream of the lens, wherein a curvature center of the cover lens is different in position from the first diffusion center when viewed from a direction perpendicular to the optical axis and the first direction.

In this aspect of the present disclosure, the cover lens may have one of a circular arc shape and an elliptical arc shape when viewed from the direction perpendicular to the optical axis and the first direction.

A light emitting device according to another aspect of the present disclosure includes a first light source, a first collimator configured to substantially collimate light emitted from the first light source with respect to a first optical axis as an optical axis of the first light source, a second light source, a second collimator configured to substantially collimate light emitted from the second light source with respect to a second optical axis as an optical axis of the second light source, an lens configured to make first light emitted from the first collimator and second light emitted form the second collimator wide-angle with respect to a first direction different from both of the first optical axis and the second optical axis, and a cover lens having a curved surface shape and disposed downstream of the lens, wherein the lens makes the first light wide-angle in the first direction from a first diffusion center as a starting point, and makes the second light wide-angle in the first direction from a second diffusion center as a starting point, and a curvature center of the cover lens is different in position from both of the first diffusion center and the second diffusion center when viewed from a direction perpendicular to the first optical axis and the second optical axis.

In this aspect of the present disclosure, the cover lens may have one of a circular arc shape and an elliptical arc shape when viewed from a direction perpendicular to the first optical axis, the second optical axis and the first direction.

In this aspect of the present disclosure, the cover lens rotates around a rotational axis line substantially parallel to the first direction.

In this aspect of the present disclosure, the lens may be a directional lens.

In this case, the lens may include a plurality of small lenses, and the small lenses may each be the directional lens.

In this aspect of the present disclosure, the lens may be a conical mirror.

An image display system according to another aspect of the present disclosure includes anyone of the light emitting devices described above, a imager configured to detect a reflection position of light emitted from the light emitting device, and a projection device configured to project an image corresponding to a detection result detected by the imager.

DESCRIPTION OF EXEMPLARY EMBODIMENTS

Figure 1:
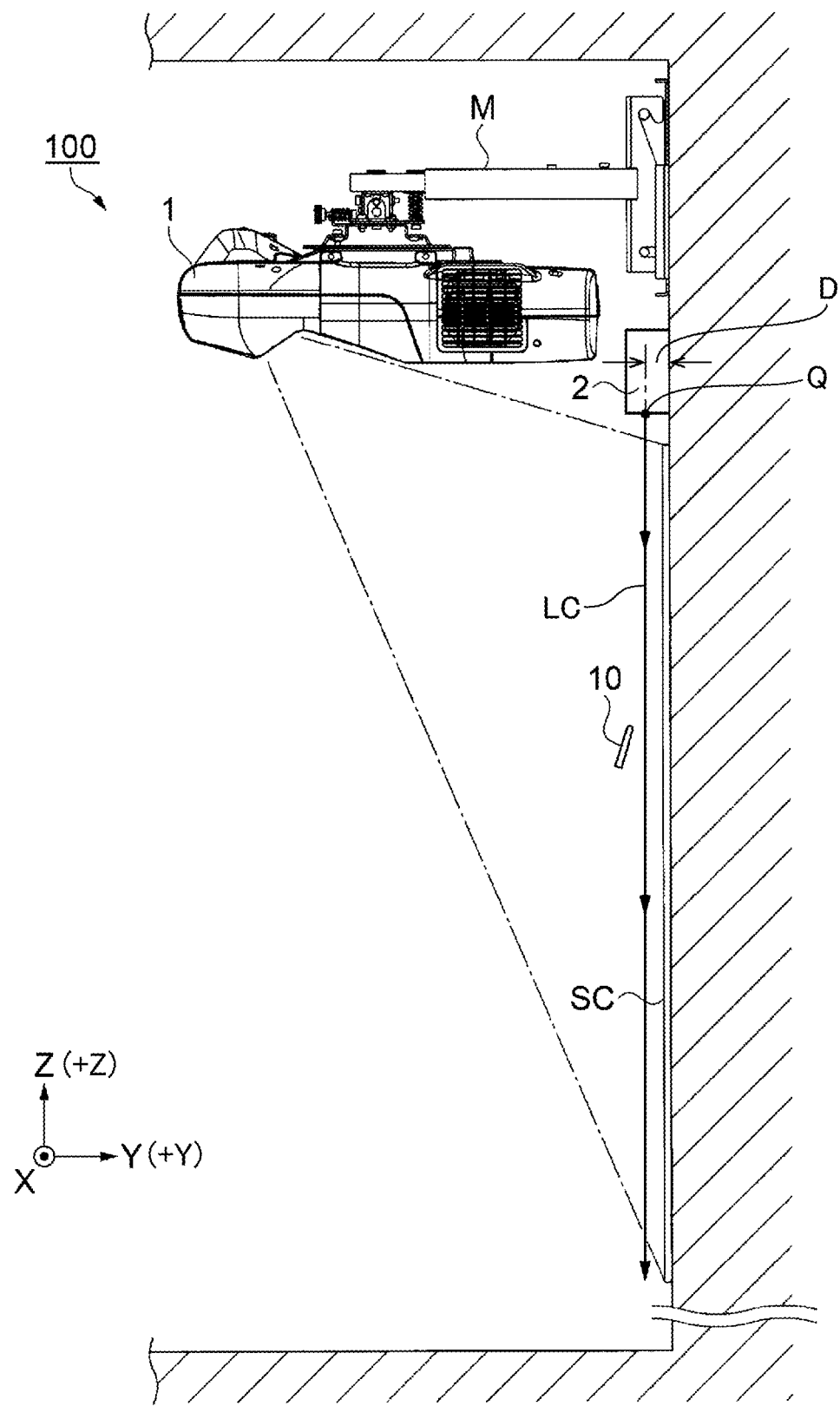
FIG. 1 is a schematic diagram showing a schematic configuration of an image display system according to Embodiment 1.

Some embodiments of the present disclosure will hereinafter be described with reference to the accompanying drawings. It should be noted that in the drawings described hereinafter, the dimensions and the ratios of the constituents are arbitrarily made different from actual ones in order to show the constituents with sizes with which the constituents can be recognized in the drawings.

Embodiment 1

Configuration of Image Display System

FIG. 1 is a schematic diagram showing a schematic configuration of an image display system 100 according to Embodiment 1. As shown in FIG. 1, the image display system 100 is provided with a projector 1 and a light emitting device 2. As shown in FIG. 1, the projector 1 is supported by a support device M installed on a wall surface above a projection surface SC such as a screen or a whiteboard, and projects an image on the projection surface SC from a side facing downward. Although described later in detail, as shown in FIG. 1, the light emitting device 2 is installed above the projection surface SC, and emits the light along the projection surface SC to create a light curtain LC.

It should be noted that in the present specification, the normal direction to the projection surface SC is defined as a front-back direction Y, and a direction facing the projection surface SC is defined as a front direction (+Y direction) as shown in FIG. 1 for the sake of convenience of explanation. Further, a vertical direction, which corresponds to a gravitational direction in this specification, is defined as a Z direction, and a gravity-defying direction is defined as an upper side (+Z direction). Further, a horizontal direction perpendicular to the front-back direction Y and the vertical direction Z is defined as a right-left direction X, and the right side when facing to the projection surface SC is defined as a +X direction. The projection surface SC is a surface parallel to an X-Z plane.

Figure 2:
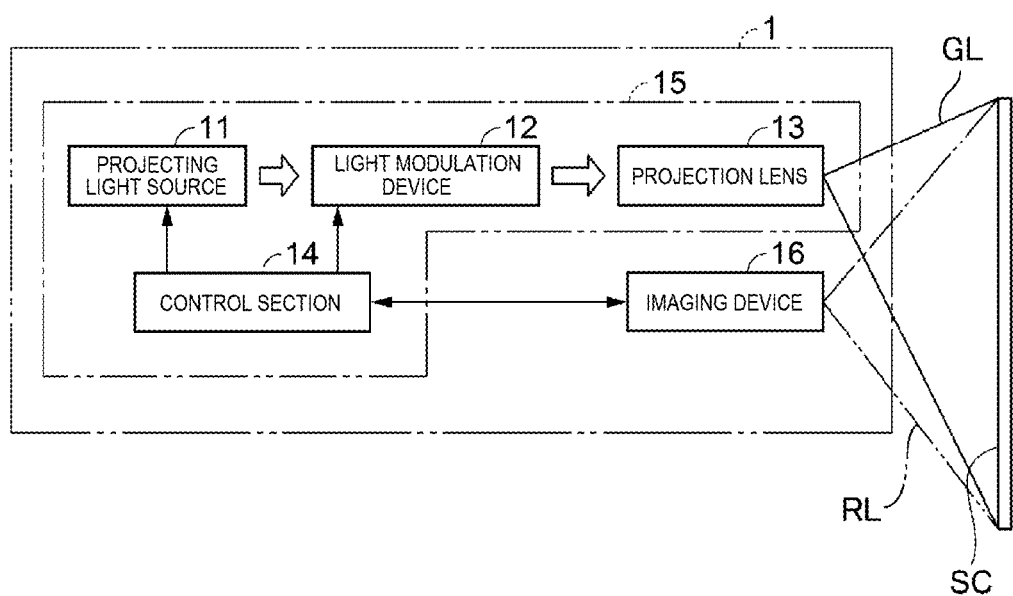
FIG. 2 is a block diagram showing a schematic configuration of a projector.

FIG. 2 is a block diagram showing a schematic configuration of the projector 1. As shown in FIG. 2, the projector 1 is provided with a projection device 15 and an imager 16. The projection device 15 is provided with a projecting light source 11, a light modulator 12, a projection lens 13 and a controller 14. The projection device 15 projects an image corresponding to image information input, or an image corresponding to a detection result detected by the imager 16 from the projection lens 13 as image light GL.

The projection device 15 modulates the light emitted from the projecting light source 11 using the light modulator 12 in accordance with the image information, and then projects the light thus modulated from the projection lens 13 on the projection surface SC. It should be noted that as the projecting light source 11, there can be used those of a discharge type, and a solid-state light source such as a light emitting diode or a laser. Further, as the light modulator 12, there can be used a device using a liquid crystal panel, a micromirror type device such as a device using a DMD and so on.

The controller 14 is a device provided with a CPU, a ROM, a RAM and so on to function as a computer, and performs, for example, control related to projection of the image based on the information output from the imager 16 in addition to control of an operation of the projector 1.

The imager 16, which is provided with imaging elements (not shown) such as CCD or CMOS, shoots the projection surface SC, and then outputs information obtained by shooting to the controller 14. Further, the imager 16 detects reflected light RL, which is a component of the light emitted from the light emitting device 2 and then reflected by the pointing body (e.g., a pen 10 or a finger of the user), to thereby detect a position (a reflection position) of the pointing body, and then outputs the information thus detected to the controller 14.

The projector 1 analyzes the position of the pointing body on the projection surface SC based on the information output from the imager 16, and then performs, for example, projection of a superimposed image obtained by superimposing a line representing the trajectory of the pointing body on the image information, and a change in the image to be projected based on the analysis result. Due to the above, it is possible to perform interactive image display which is the image display corresponding to an action of the user on the projection surface SC.

Configuration of Light Emitting Device

Figure 3:
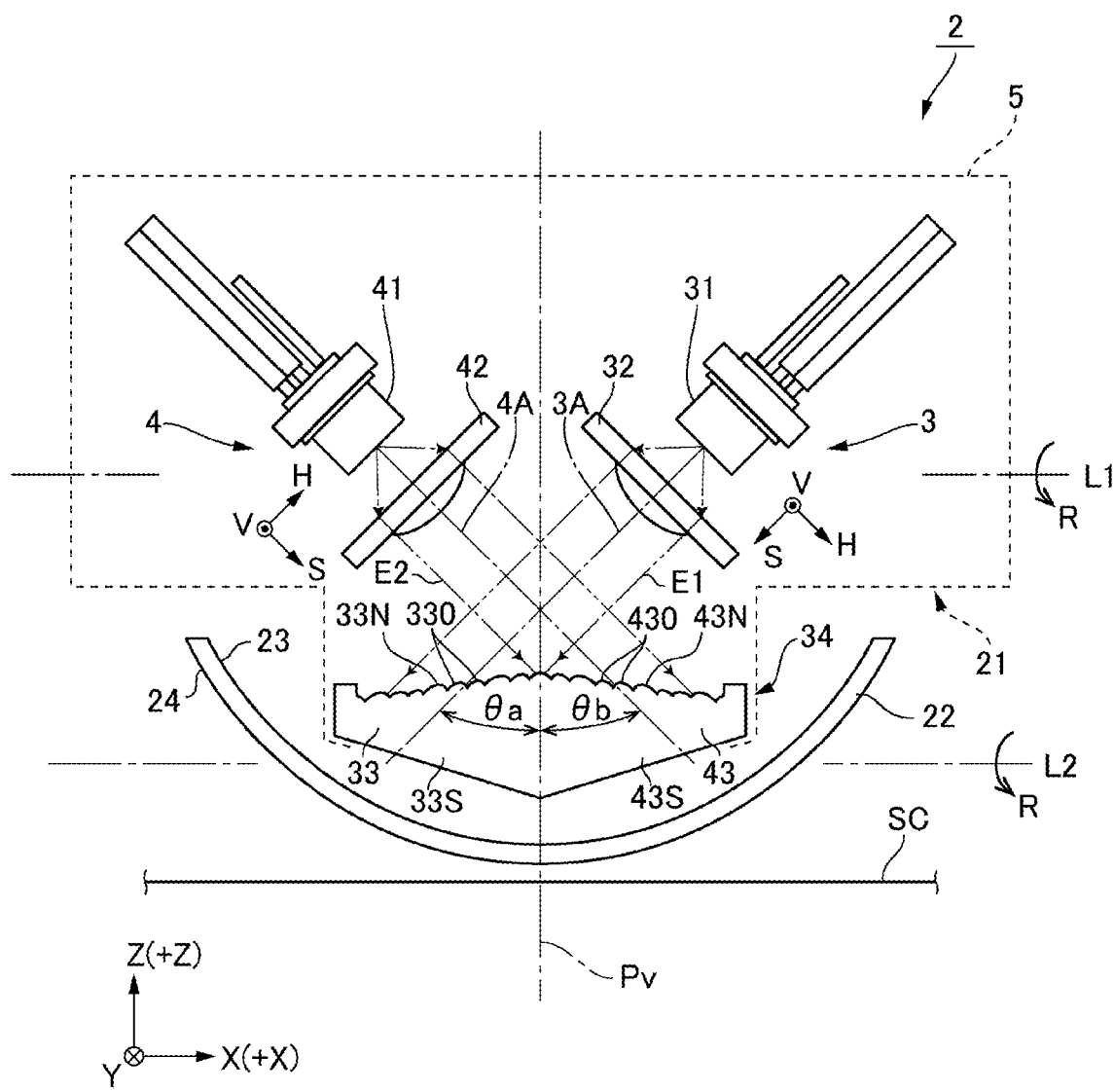
FIG. 3 is a schematic diagram showing a schematic configuration of a light emitting device according to Embodiment 1.

FIG. 3 is a schematic diagram showing a schematic configuration of the light emitting device 2. The light emitting device 2 is disposed above an upper hem of the projection surface SC, and at substantially the center of the projection surface SC in the right-left direction X. The light emitting device 2 emits the light along the projection surface SC. The light emitting device 2 is provided with a device main body 21 and a cover lens 22. The device main body 21 is provided with a first light emitter 3, a second light emitter 4 and a housing 5 for housing these sections inside.

Figure 4:
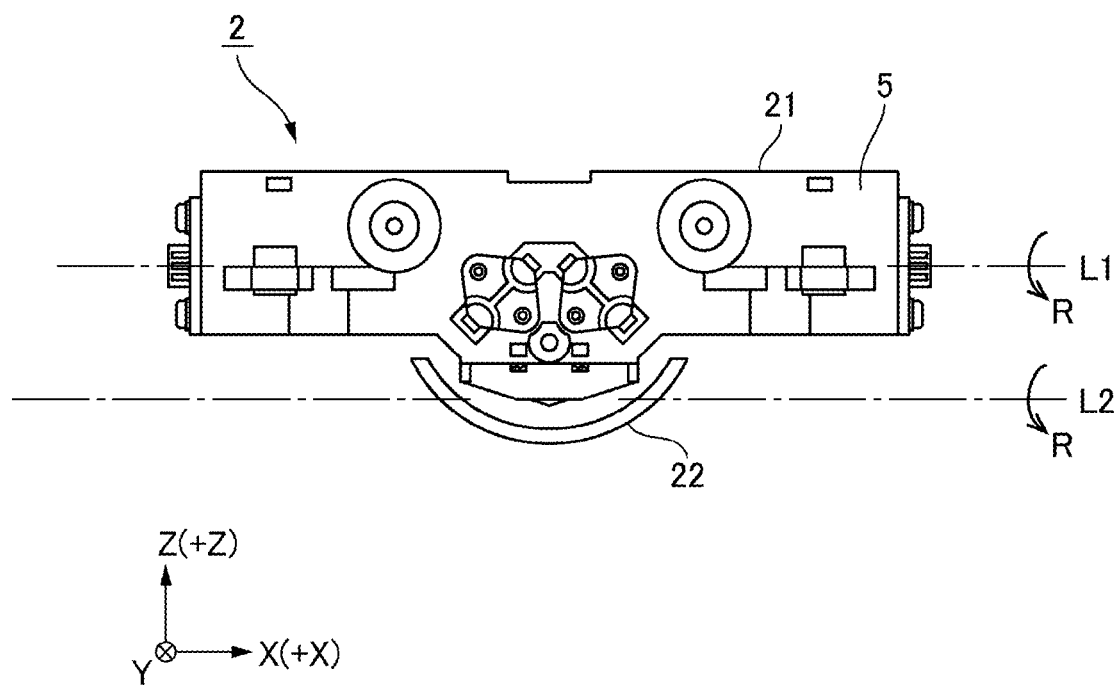
FIG. 4 is a plan view of a device main body and a cover lens.

FIG. 4 is a plan view of the device main body 21 and the cover lens 22. In the light emitting device 2, the device main body 21 and the cover lens 22 are supported so as to be able to rotate independently of each other. The device main body 21 can rotate around a first axis L1, and the cover lens 22 can rotate around a second axis L2. The light emitting device 2 is disposed so that the first axis L1 and the second axis L2 become substantially parallel to the right-left direction X.

As shown in FIG. 3, the first light emitter 3 and the second light emitter 4 are arranged in the right-left direction X, and emit the light centered on respective directions different from each other. When a plane (a plane along the Y-Z plane) perpendicular to the projection surface SC, and at the same time extending in the vertical direction Z between the first light emitter 3 and the second light emitter 4 is defined as a virtual center plane Pv, the first light emitter 3 and the second light emitter 4 are configured symmetrically with reference to the virtual center plane Pv. The first light emitter 3 is provided with a first light source 31, a first collimator 32 and a first lens 33. The first collimator 32 and the first lens 33 are disposed on a first optical axis 3A as an optical axis of the first light source 31, and emit the light obliquely downward left.

Similarly to the first light emitter 3, the second light emitter 4 is provided with a second light source 41, a second collimator 42 and a second lens 43, and has a second light path extending from the second light source 41 to the second lens 43. The second collimator 42 and the second lens 43 are disposed on a second optical axis 4A as an optical axis of the second light source 41, and emit the light around a direction obliquely downward right.

In the light emitting device 2, the first optical axis 3A and the second optical axis 4A cross each other in an anterior stage of the light path of each of the first lens 33 and the second lens 43. Specifically, the first optical axis 3A and the second optical axis 4A cross each other between the first collimator 32 and the first lens 33 and between the second collimator 42 and the second lens 43. In other words, in the light emitting device 2, there is adopted a configuration in which the light emitted from the first light emitter 3 and the light emitted form the second light emitter 4 partially overlap each other.

The first light source 31 and the second light source 41 are each a laser source for emitting the light having the peak light intensity at a wavelength of about 940 nm, and each have, for example, an active layer as a light emitter and cladding layers respectively stacked on both sides of the active layer. As the first light source 31 and the second light source 41, there is used a laser source of a type such as a multimode oscillation type in which the light distribution characteristic is different between a width direction H and a stacking direction V, wherein the width direction H is parallel to the active layer, the stacking direction V is perpendicular to the width direction H, and the active layer and the cladding layers are stacked in the stacking direction V. The light from the first light source 31 and the light from the second light source 41 are each emitted in an S direction perpendicular to the width direction H and the stacking direction V. In other words, the S direction is the direction along each of the first optical axis 3A and the second optical axis 4A. In Embodiment 1, the width direction H and the S direction are set to the directions along the projection surface SC shown in FIG. 1. In other words, the width direction H and the S direction are made parallel to the X-Z plane.

The first collimator 32 substantially collimates the light emitted from the first light source 31. Similarly, the second collimator 42 substantially collimates the light emitted from the second light source 41. For example, the first collimator 32 makes component light, which is emitted from a point on the first optical axis 3A and spreads at an angle with the first optical axis 3A, proceed so as to substantially be parallel to the first optical axis 3A. Similarly, the second collimator 42 makes component light, which is emitted from a point on the second optical axis 4A and spreads at an angle with the second optical axis 4A, proceed so as to substantially be parallel to the second optical axis 4A.

The first lens 33 and the second lens 43 are provided to a single lens body 34. The lens body 34 is formed of a material such as synthetic resin high in refractive index, and has a rectangular shape when viewed from the vertical direction Z. As shown in FIG. 3, the lens body 34 has a symmetrical shape with reference to the virtual center plane Pv, wherein the first lens 33 is located on the left side (the −X direction side) and the second lens 43 is located on the right side (the +X direction side). Further, the lens body 34 is disposed so as to have symmetry about the virtual center plane Pv.

The first lens 33 is tilted toward a direction in which the distance from the first collimator 32 increases as the distance from the virtual center plane Pv increases. The first lens 33 is provided with a first incident plane 33N having a plurality of small lenses 330 arranged on a light incident side opposed to the first collimator 32, and a first plane 33S disposed on a light exit side. Each of the small lenses 330 is a Powell lens, and has a convex shape on the first collimator 32 side. Each of the small lenses 330 extends in the stacking direction V, and the plurality of small lenses 330 is arranged in a direction perpendicular to the stacking direction V. The plurality of small lenses 330 is arranged in the width direction H on the first incident plane 33N, and at the same time, arranged in a direction in which the distance from the first collimator 32 increases as the distance from the virtual center plane Pv increases.

The first lens 33 makes first light E1 emitted from the first collimator 32 wide-angle in the width direction H while keeping the direction of the first light E1 having been collimated by the first collimator 32 in the stacking direction V, and then emits the first light E1 around the first optical axis 3A. In other words, the first lens 33 makes the first light E1 entering the first lens 33 wide-angle only in the direction corresponding to the width direction H out of the directions perpendicular to the first optical axis 3A. On this occasion, the plurality of small lenses 330 provided to the first lens 33 is formed so that the light made wide-angle by one of the small lenses 330 and the light made wide-angle by adjacent one of the small lenses 330 in the width direction H are superimposed with each other.

The second lens 43 is configured so as to be symmetrical to the first lens 33 about the virtual center plane Pv. Specifically, the second lens 43 is provided with a second incident plane 43N having a plurality of small lenses 430 arranged on a light incident side opposed to the second collimator 42, and a second plane 43S disposed on a light exit side. The second lens 43 makes second light E2 emitted from the second collimator 42 wide-angle only in a direction corresponding to the width direction H out of the directions perpendicular to the second optical axis 4A. On this occasion, the plurality of small lenses 430 provided to the second lens 43 is formed so that the light made wide-angle by one of the small lenses 430 and the light made wide-angle by adjacent one of the small lenses 430 in the width direction H are superimposed with each other.

As shown in FIG. 3, the light emitting device 2 is arranged so that the width direction H of the light emitted from each of the first lens 33 and the second lens 43 becomes a direction along the projection surface SC. In other words, the first light emitter 3 and the second light emitter 4 are arranged so that the light made wide-angle in each of the first lens 33 and the second lens 43 is parallel to the right-left direction X of the projection surface SC. In other words, the light emitting device 2 makes the first light E1 and the second light E2 emitted respectively from the first collimator 32 and the second collimator 42 wide-angle in the right-left direction X which is a first direction different from both of the first optical axis 3A and the second optical axis 4A.

Further, as shown in FIG. 3, in the light emitting device 2, the first light emitter 3 and the second light emitter 4 are tilted in respective directions different from each other with respect to the virtual center plane Pv, and a part of the light emitted by the first light emitter 3 and a part of the light emitted by the second light emitter 4 overlap each other at the position of the virtual center plane Pv. Specifically, when viewed from the −Y direction toward +Y direction, the first light axis 3A is tilted in a clockwise direction with respect to the virtual center plane Pv, and the second optical axis 4A is tilted in a counterclockwise direction with respect to the virtual center plane Pv. A tilt angle θa of the first optical axis 3A with respect to the virtual center plane Pv and a tilt angle θb of the second optical axis 4A are the same (θa=θb), and thus, the first light emitter 3 and the second light emitter 4 are arranged so as to be substantially symmetrical to each other about the virtual center plane Pv. Thus, the light emitting device 2 emits the light along the projection surface SC to create the light curtain LC covering the entire area of the projection surface SC.

The tilt angles θa, θb are set to angles corresponding to the aspect ratio of the projection surface SC. For example, the light emitting device 2 is configured so as to efficiently emit the light along the projection surface SC which is a landscape surface with the aspect ratio of 16:10. Specifically, in order to provide the highest intensity to the light proceeding toward right and left end parts of a lower hem of the projection surface SC which are the farthest position from the light emitting device 2, the tilt angles θa, θb are set so that the first optical axis 3A extends toward the left end part of the lower hem of the projection surface SC, and the second optical axis 4A extends toward the right end part of the lower hem of the projection surface SC. It should be noted that the aspect ratio of the projection surface is not limited to 16:10, but can also be other values. For example, 2:1 can also be adopted. When the aspect ratio is 2:1, the tilt angles θa, θb are set to 45°.

Since in the light emitting device 2, the light path of the first light emitter 3 and the light path of the second light emitter 4 cross each other, the light emitted by the first light emitter 3 and the light emitted by the second light emitter 4 overlap at a position near to the light emitting device 2 as shown in FIG. 3. In other words, it becomes possible for the light emitting device 2 to emit the light sufficient in light intensity in an area adjacent to the light emitting device 2. Thus, even when the light emitting device 2 is disposed near to the projection surface SC, the light emitting device 2 emits the light sufficient to detect the pointing body also in an area adjacent to the light emitting device 2 in the projection surface SC.

Shape of Light Curtain

FIGS. 5 through 8 are each a schematic diagram showing a shape of the light curtain LC. As shown in FIG. 1, the light emitting device 2 is installed so as to protrude backward from a wall surface above the projection surface SC. Therefore, the first light emitter 3 and the second light emitter 4 each emit the light downward from an emission position Q posterior to the projection surface SC. Specifically, the emission position Q of the light in the light emitting device 2 is away from the projection surface SC in the front-back direction Y as much as a distance D. The distance D is, for example, about 10 mm.

Figure 5:
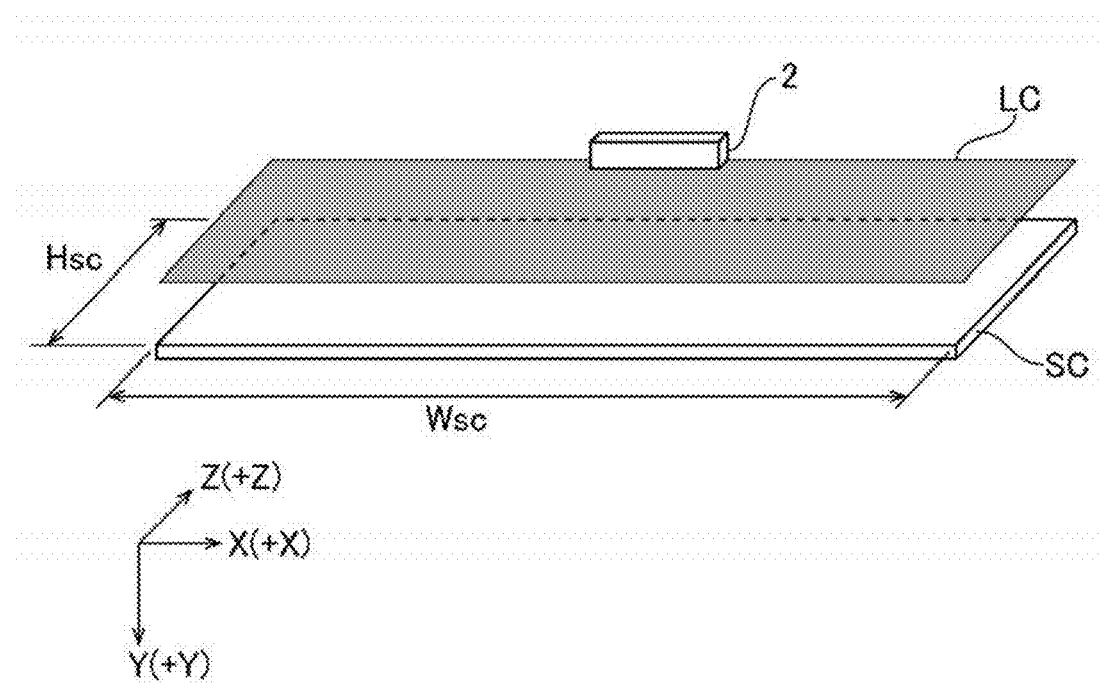
FIG. 5 is a schematic diagram showing a shape of a light curtain when emitting light in substantially parallel to the projection surface.

FIG. 5 is a schematic diagram showing the shape of the light curtain LC when emitting the light in substantially parallel to the projection surface SC. The light curtain LC shown in FIG. 5 is away from the projection surface SC. As described below, the light emitting device 2 is arranged so that installation angles of the device main body 21 and the cover lens 22 can be adjusted, and thus it is possible to adjust the irradiation direction with the light proceeding toward the projection surface SC. Therefore, the light emitting device 2 is provided with a mechanism for adjusting the installation angles of the device main body 21 and the cover lens 22.

Figure 6:
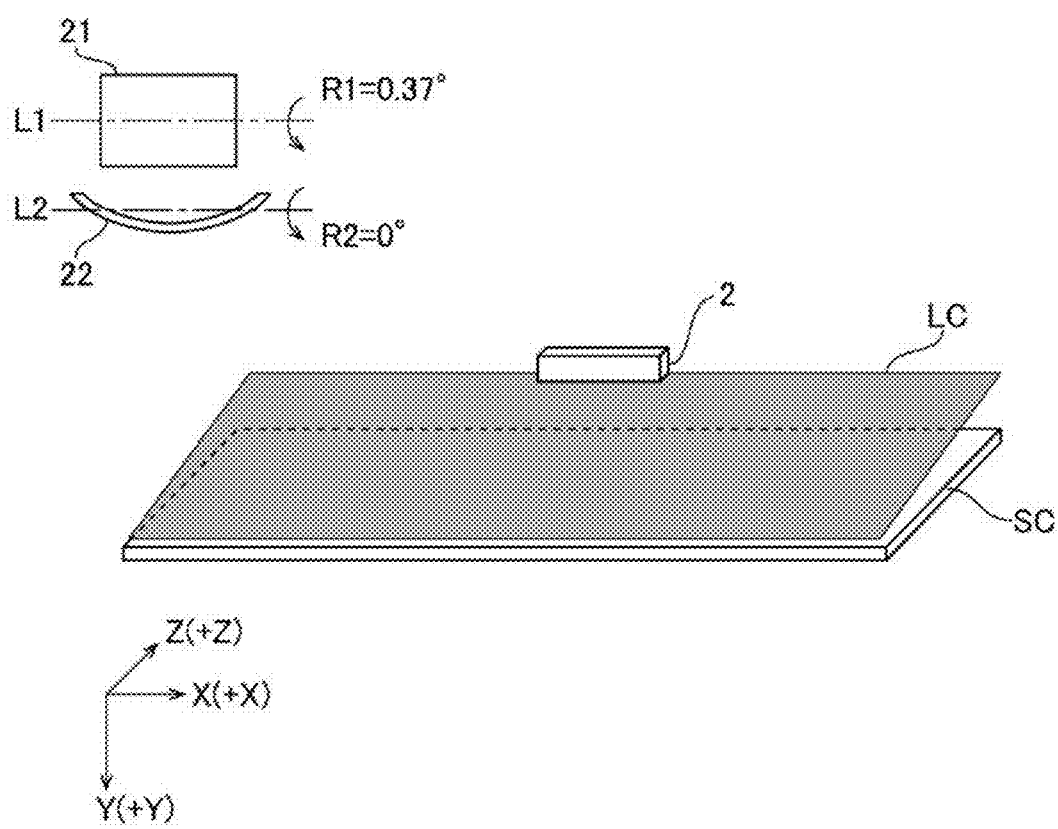
FIG. 6 is a schematic diagram showing a shape of a light curtain tilted so as to be emitted obliquely downward toward the projection surface.
Figure 7:
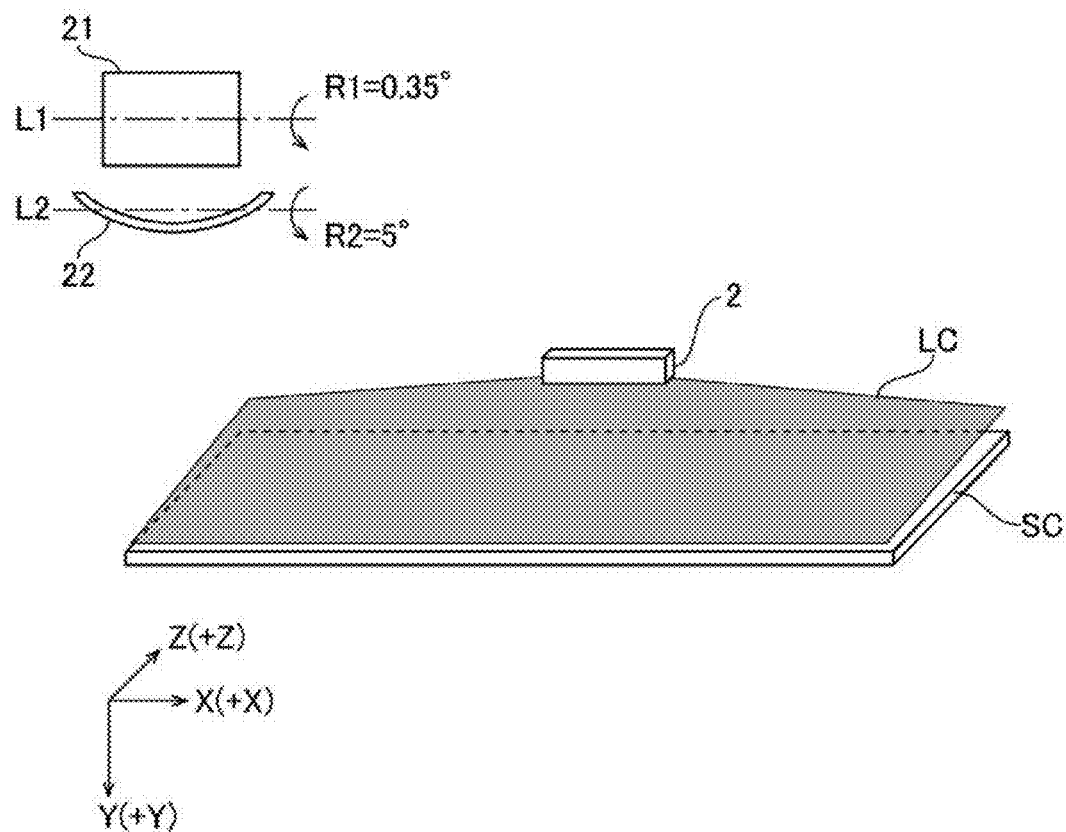
FIG. 7 is a schematic diagram showing a shape of a light curtain deformed so as to shorten distances from right and left end parts at the upper end of the projection surface.
Figure 8:
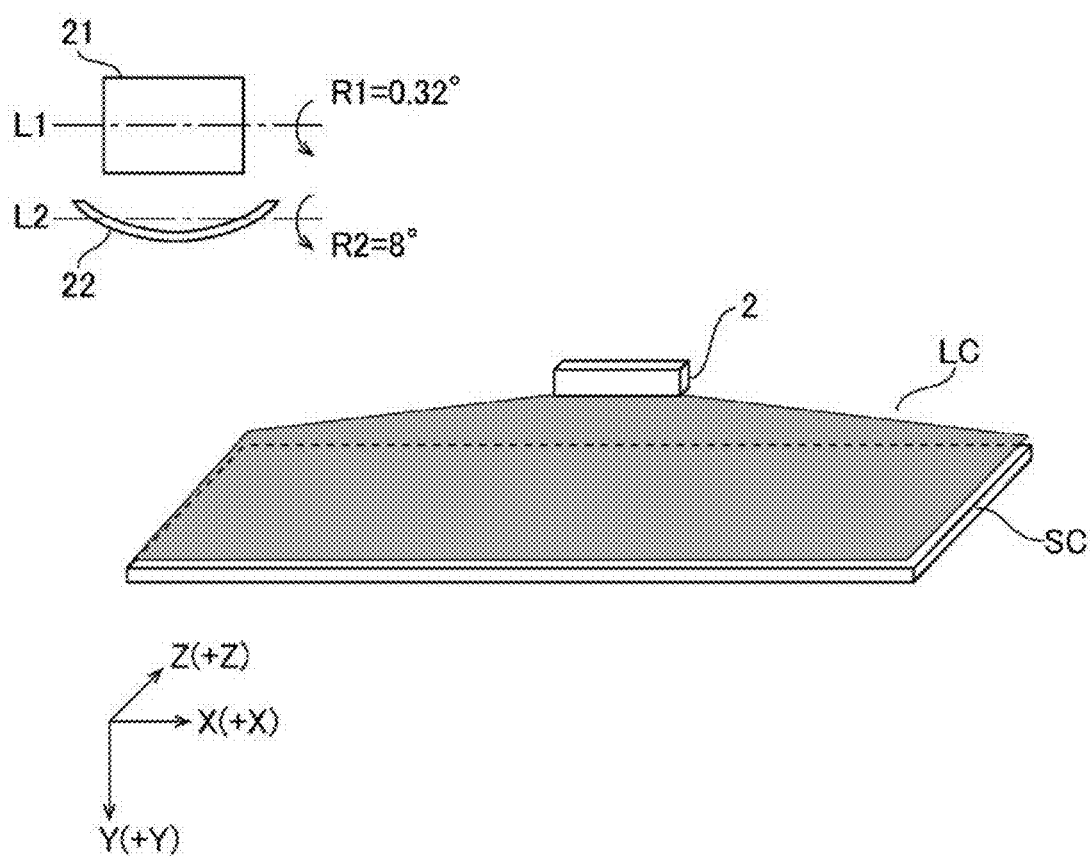
FIG. 8 is a schematic diagram showing a shape of a light curtain deformed so as to shorten distances from right and left end parts at the upper end of the projection surface.

By setting the installation angles of the device main body 21 and the cover lens 22 to appropriate angles, the light curtain LC created by the light emitting device 2 is deformed into a shape with which the distance from the projection surface SC is gradually shortened with respect not only to the lower end of the projection surface SC but also to right and left end parts at the upper end of the projection surface SC. The shape of the light curtain LC shown in FIG. 5 is the shape obtained before shortening the distance from the projection surface SC. FIG. 6 is a schematic diagram showing the shape of the light curtain LC tilted so as to be emitted obliquely downward toward the projection surface. FIG. 7 and FIG. 8 are each a schematic diagram showing the shape of the light curtain LC deformed so as to shorten the distances from the right and left end parts at the upper end of the projection surface SC.

In the light emitting device 2, the device main body 21 and the cover lens 22 are each supported by a frame not shown so as to rotate independently. As shown in FIG. 3 and FIG. 4, the device main body 21 can rotate around the first axis L1 as a rotational axis substantially parallel to the right-left direction X. Further, the cover lens 22 can rotate around the second axis L2 as a rotational axis substantially parallel to the right-left direction X and disposed at a position different in the vertical direction Z from that of the first axis L1. The light emitting device 2 is provided with a first angle adjustment mechanism not shown for adjusting the installation angle of the device main body 21 in a rotational direction around the first axis L1, and a second angle adjustment mechanism not shown for adjusting the installation angle of the cover lens 22 in a rotational direction around the second axis L2. The first angle adjustment mechanism and the second angle adjustment mechanism can arbitrarily be configured using a gear, a shaft member and so on.

Adjustment of Installation Angle of Device Main Body

When installing the light emitting device 2 setting the positions of the device main body 21 and the cover lens 22 to initial positions, the light curtain LC substantially parallel to the projection surface SC is formed at a position away from the projection surface SC as shown in FIG. 5. In the adjustment of the installation angle of the device main body 21, the device main body 21 is rotated around the first axis L1 toward a first rotational direction R (see FIG. 3 and FIG. 4) as a direction of changing the emission direction of the light toward the projection surface SC. Thus, the light curtain LC is tilted so as to be emitted obliquely downward toward the projection surface SC as shown in FIG. 6. Therefore, the light curtain LC comes closer to the projection surface SC in the lower area of the projection surface SC.

FIG. 6 shows a result of a simulation of a relationship between L and R1, where L represents the distance between the light curtain LC and the projection surface SC, and R1 represents the rotational angle toward the first rotational direction R of the device main body 21. When performing the simulation under the condition of assuming the distance D in the front-back direction Y between the emission position Q in the light emitting device 2 and the projection surface SC as 10 mm, the width Wsc of the projection surface SC as 2,154 mm, and the height Hsc of the projection surface SC as 1,346 mm, it has been achieved to make the light curtain LC closer to the lower end of the projection surface SC when setting the rotational angle R1 toward the first rotational direction R of the device main body 21 to 0.37°.

Adjustment of Installation Angle of Cover Lens

In the adjustment of the installation angle of the cover lens 22, the cover lens 22 having a convex shape protruding toward downward is rotated around the second axis L2 in the same direction as the first rotational direction R. On this occasion, when viewed from the right-left direction X, the cover lens 22 rotates in a direction of getting closer to the projection surface SC. Thus, as shown in FIG. 7 and FIG. 8, the light curtain LC fails to become flat, and the distances between the light curtain LC and corners on both sides in the right-left direction X of the projection surface SC decrease also at the upper end of the projection surface SC.

FIG. 7 and FIG. 8 each show a result of a simulation of a relationship between L, R1, and R2, where L represents the distance between the light curtain LC and the projection surface SC, R1 represents the rotational angle toward the first rotational direction R of the device main body 21 with respect to the initial position, and R2 represents a rotational angle toward the first rotational direction R of the cover lens 22 with respect to the initial position. It should be noted that the simulation has been performed under the condition of assuming the distance D in the front-back direction Y between the emission position Q in the light emitting device 2 and the projection surface SC as 10 mm, the width Wsc of the projection surface SC as 2,154 mm, and the height Hsc of the projection surface SC as 1,346 mm. As shown in FIG. 7, when assuming the rotational angle R1 toward the first rotational direction R of the device main body 21 as 0.35°, and the rotational angle R2 toward the first rotational direction R of the cover lens 22 as 5°, the right and left end parts at the upper end of the light curtain LC are farther from the projection surface SC than the lower end of the light curtain LC although the middle of the upper end of the light curtain LC deforms into a shape convex backward. In contrast, as shown in FIG. 8, when assuming the rotational angle R1 toward the first rotational direction R of the device main body 21 as 0.32°, and the rotational angle R2 toward the first rotational direction R of the cover lens 22 as 8°, it has been achieved to make the light curtain LC closer to the projection surface SC in the same level with respect to the lower end of the projection surface SC and the right and left end parts at the upper end of the projection surface SC.

When making the size of the projection surface SC smaller than in the condition described above to make the width Wsc of the projection surface SC smaller than 2,154 mm, by further increasing the rotational angle of the cover lens 22 to a level larger than 8°, it is possible to shorten the distance between the projection surface SC and the right and left end parts at the upper end of the light curtain LC to substantially the same level as in FIG. 8. In other words, the appropriate rotational angle of the cover lens 22 is determined in accordance with the size of the projection surface SC.

When installing the light emitting device 2, the light emitting device 2 is installed in the state in which the adjustment of the installation angle of the device main body 21 and the adjustment of the installation angle of the cover lens 22 are performed to form the light curtain LC shown in FIG. 8. The adjustment of the installation angles of the device main body 21 and the cover lens 22 is performed in the following procedure. Firstly, the light emitting device 2 is installed with the positions of the device main body 21 and the cover lens 22 set to the initial positions. Then, the projection surface SC is shot using a camera capable of shooting the emitted light from the light emitting device 2 to perform the adjustment of the installation angles of the device main body 21 and the cover lens 22 while checking the distance between the light curtain LC and the projection surface SC with the image of the projection surface SC thus shot. For example, when the light emitting device 2 emits an infrared laser beam, the adjustment of the installation angles of the device main body 21 and the cover lens 22 is performed while shooting the projection surface SC with an infrared camera.

It should be noted that it is also possible to install the light emitting device 2 in a state in which the installation angle of the device main body 21 and the installation angle of the cover lens 22 are tilted in advance as much as a certain amount from the initial positions, and then perform a fine adjustment of the installation angles while shooting the projection surface SC with the infrared camera. Alternatively, it is also possible to fix one of the installation angle of the device main body 21 and the installation angle of the cover lens 22, and adjust only the other.

Curvature Center of Cover Lens and Diffusion Center of Lens

Figure 9:
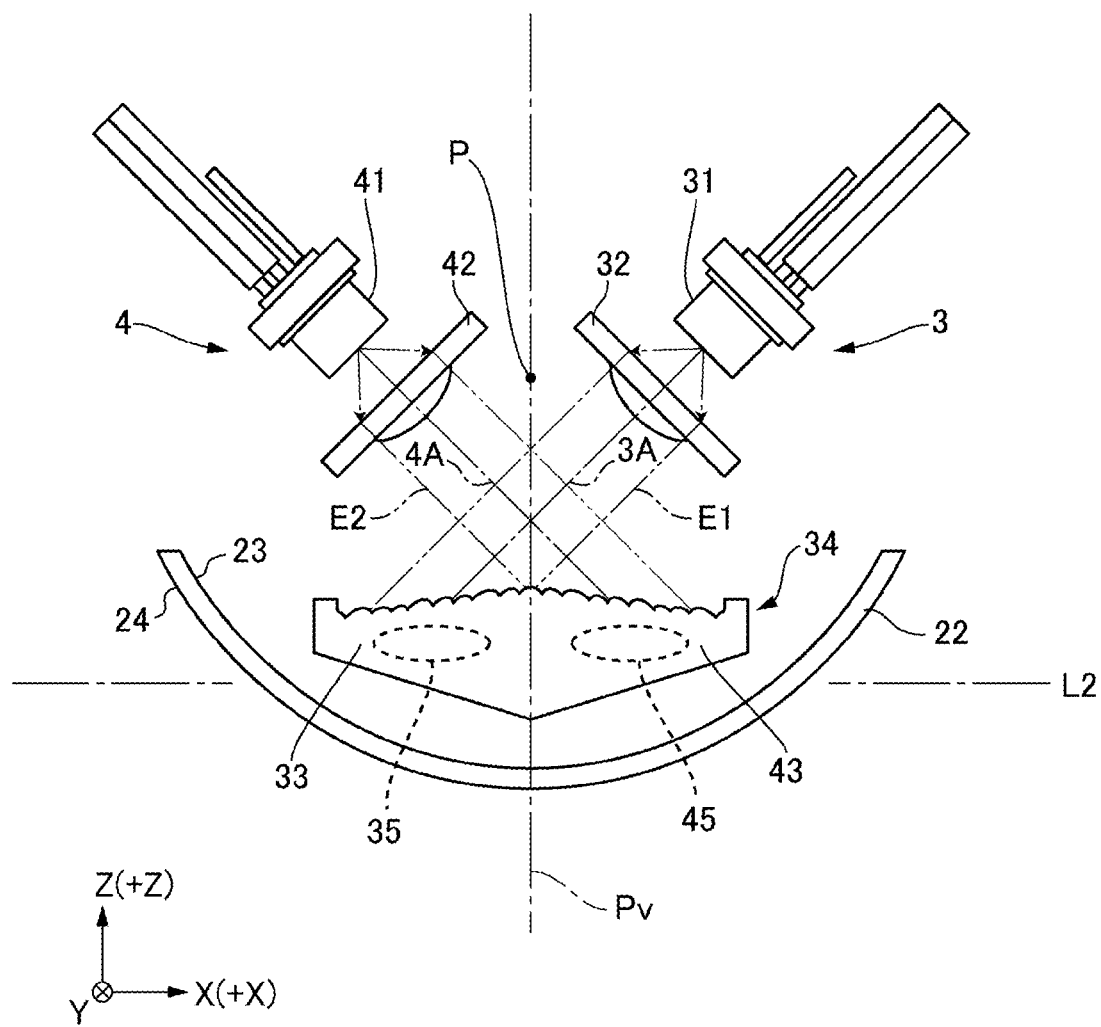
FIG. 9 is a schematic diagram showing a curvature center of the cover lens and diffusion centers of first light and second light.

Here, the principle of the phenomenon that the shape of the light curtain LC changes to a shape other than a flat shape due to the adjustment of the installation angle of the cover lens 22 will be described. FIG. 9 is a schematic diagram showing a curvature center P of the cover lens 22 and diffusion centers of the first light E1 and the second light E2. The cover lens 22 has a curved surface shape convex downward (toward the −direction). Specifically, the cover lens 22 in Embodiment 1 has a circular arc shape when viewed from the front-back direction Y, and the curvature center P of the cover lens 22 is located on the virtual center plane Pv. Further, the cover lens 22 extends in the front-back direction Y, and has a rectangular shape when viewed from the vertical direction Z. An inner surface 23 and an outer surface 24 of the cover lens 22 coincide in curvature center with each other. The cover lens 22 is symmetrically disposed about the virtual center plane Pv, and covers the first light emitter 3 and the second light emitter 4 from the light exit side. Therefore, the light emitted from each of the first light emitter 3 and the second light emitter 4 toward the projection surface SC is emitted through the cover lens 22.

The first light E1 having entered the first incident plane 33N of the first lens 33 from the first collimator 32 is converged most in the right-left direction X in a first diffusion center 35 in the first lens 33, and is made wide-angle in the right-left direction X from the first diffusion center 35 as a starting point. Similarly, the second light E2 having entered the second incident plane 43N of the second lens 43 from the second collimator 42 is converged most in the right-left direction X in a second diffusion center 45 in the second lens 43, and is made wide-angle in the right-left direction X from the second diffusion center 45 as a starting point. As shown in FIG. 9, in the lens body 34 in Embodiment 1, the first diffusion center 35 and the second diffusion center 45 are each an area having a predetermined size but not a point. The first diffusion center 35 and the second diffusion center 45 are symmetric to each other about the virtual center plane Pv.

In the light emitting device 2, the curvature center P of the cover lens 22 is different in position from the first diffusion center 35 and the second diffusion center 45 when viewed from a direction (i.e., the front-back direction Y) perpendicular to the first optical axis 3A, the second optical axis 4A and the right-left direction X. In other words, the cover lens 22 is eccentrically disposed with respect to the first diffusion center 35 and the second diffusion center 45. As shown in FIG. 9, when viewed from the front-back direction Y, the curvature center P fails to overlap the first diffusion center 35 or the second diffusion center 45, and is separated in the vertical direction Z from the first diffusion center 35 and the second diffusion center 45. For example, when the curvature radius of the inner surface 23 of the cover lens 22 is 16 mm, and the curvature radius of the outer surface 24 is 18 mm, the curvature center P is separated from the first diffusion center 35 and the second diffusion center 45 in the vertical direction Z at a distance of 9.5 mm.

Figure 10:
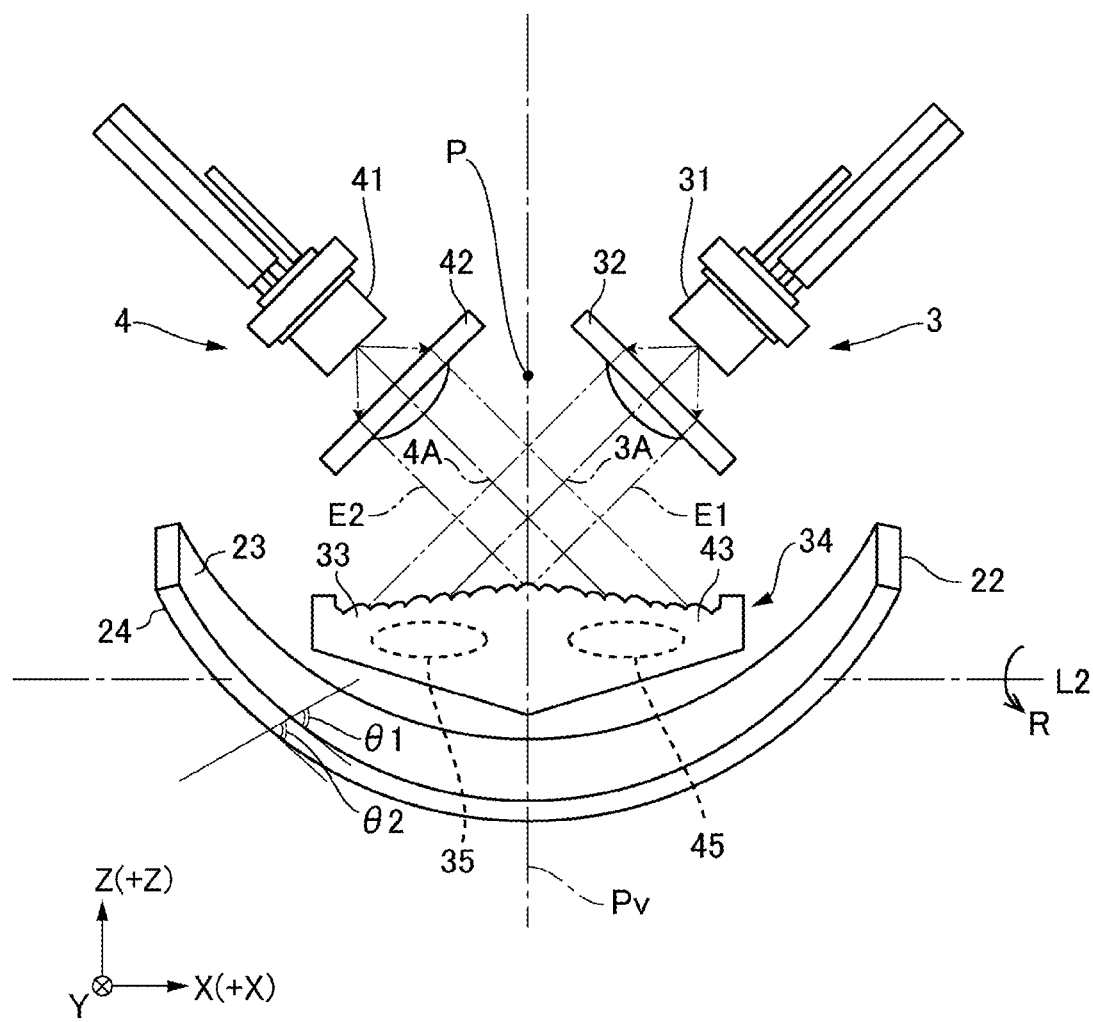
FIG. 10 is a schematic diagram showing a state of tilting the cover lens.

FIG. 10 is a schematic diagram showing a state in which the cover lens 22 is tilted with respect to a plane including the first optical axis 3A and the second optical axis 4A. When the curvature center P is different in position from the first diffusion center 35 and the second diffusion center 45, since an angle θ1 formed between the incident direction of the light to the cover lens 22 and θ2 formed between the incident direction of the light to the cover lens 22 and the tangential direction of the outer surface 24 become different in angle from each other when tilting the cover lens 22 around the second axis L2, the light transmitted through the cover lens 22 is emitted with refraction. The incident light to the cover lens 22 is made wide-angle in the right-left direction X, and the refraction angle is different by the emission direction. As a result, as shown in FIG. 7 and FIG. 8, there is formed the light curtain LC deformed to be convex protruding toward the −Y direction.

Major Functions and Advantages of Present Embodiment

As described hereinabove, the light emitting device 2 according to Embodiment 1 is provided with the first light emitter 3 and the second light emitter 4, and the first light emitter 3 is provided with the first light source 31, the first collimator 32 and the first lens 33, wherein the first light source 31 emits the light, the first collimator 32 substantially collimates the light emitted from the first light source 31 with respect to the first optical axis 3A, and the first lens 33 makes the first light E1 emitted from the first collimator 32 wide-angle with respect to the right-left direction X as the first direction different from the first optical axis 3A. Further, the second light emitter 4 is provided with the second light source 41, the second collimator 42 and the second lens 43, wherein the second light source 41 emits the light, the second collimator 42 substantially collimates the light emitted from the second light source 41 with respect to the second optical axis 4A, and the second lens 43 makes the second light E2 emitted from the second collimator 42 wide-angle with respect to the right-left direction X as the first direction different from the second optical axis 4A. Further, the curvature center P of the cover lens 22 having the curved surface shape disposed downstream of the first lens 33 and the second lens 43 is different in position from both of the first diffusion center 35 forming the starting point from which the first light E1 is made wide-angle in the first lens 33, and the second diffusion center 45 forming the starting point from which the second light E2 is made wide-angle in the second lens 43.

As described above, in the light emitting device 2 according to Embodiment 1, the cover lens 22 has the curved surface shape, and the cover lens 22 is eccentrically disposed with respect to the first diffusion center 35 and the second diffusion center 45. Therefore, when tilting the cover lens 22 with respect to the plane including the first optical axis 3A and the second optical axis 4A, the light emitted after being made wide-angle in the right-left direction X is refracted in accordance with the emission direction, and thus, the light curtain LC is deformed. Thus, the distance between the projection surface SC and the light curtain LC decreases in a direction toward the right and left end parts at the upper end of the projection surface SC. Therefore, it is possible for the image display system equipped with the light emitting device 2 according to Embodiment 1 to improve the operability of the touch operation in the upper part of the projection surface SC.

In the Embodiment 1, the cover lens 22 is supported so as to be able to rotate around the second axis L2 as the rotational axis line substantially parallel to the right-left direction X. It is possible to adjust the installation angle of the cover lens 22 to the appropriate angle. On this occasion, since the adjustment can be performed while checking the shape of the light curtain LC shot by the infrared camera, it is easy to adjust the installation angle.

The cover lens 22 in Embodiment 1 has a circular arc shape when viewed from the front-back direction Y. Therefore, by arranging the cover lens 22 so that the center point (the curvature center) of the circular arc shape becomes different in position from the diffusion centers 35, 45, it is possible to shorten the distances between the light curtain LC and the right and left end parts at the upper end of the projection surface SC by tilting the cover lens 22 with respect to the plane including the first optical axis 3A and the second optical axis 4A as described above.

In Embodiment 1, the first lens 33 and the second lens 43 are each a directional lens. Therefore, since it is possible to diffuse the light in the right-left direction X of the projection surface SC with the first lens 33 and the second lens 43, it is possible to irradiate the entire range of the projection surface SC a landscape shape with the light. Further, the first lens 33 and the second lens 43 are respectively provided with the lens arrays having the small lenses 330, 430 each formed of a Powell lens as the directional lens arranged in an array. By arranging the Powell lenses in an array as described above, the light made wide-angle by the small lenses 330, 430 adjacent to each other is superimposed with each other. Therefore, even when the deterioration in positional accuracy between the first light source 31 and the first lens 33 and the deterioration in positional accuracy between the second light source 41 and the second lens 43 occur, it is possible to suppress the eccentricity of the intensity distribution of the light in the direction along the projection surface SC. Therefore, it becomes possible to loosen the alignment accuracy between the first light source 31 and the first lens 33 and the alignment accuracy between the second light source 41 and the second lens 43.

Second Embodiment

Figure 11:
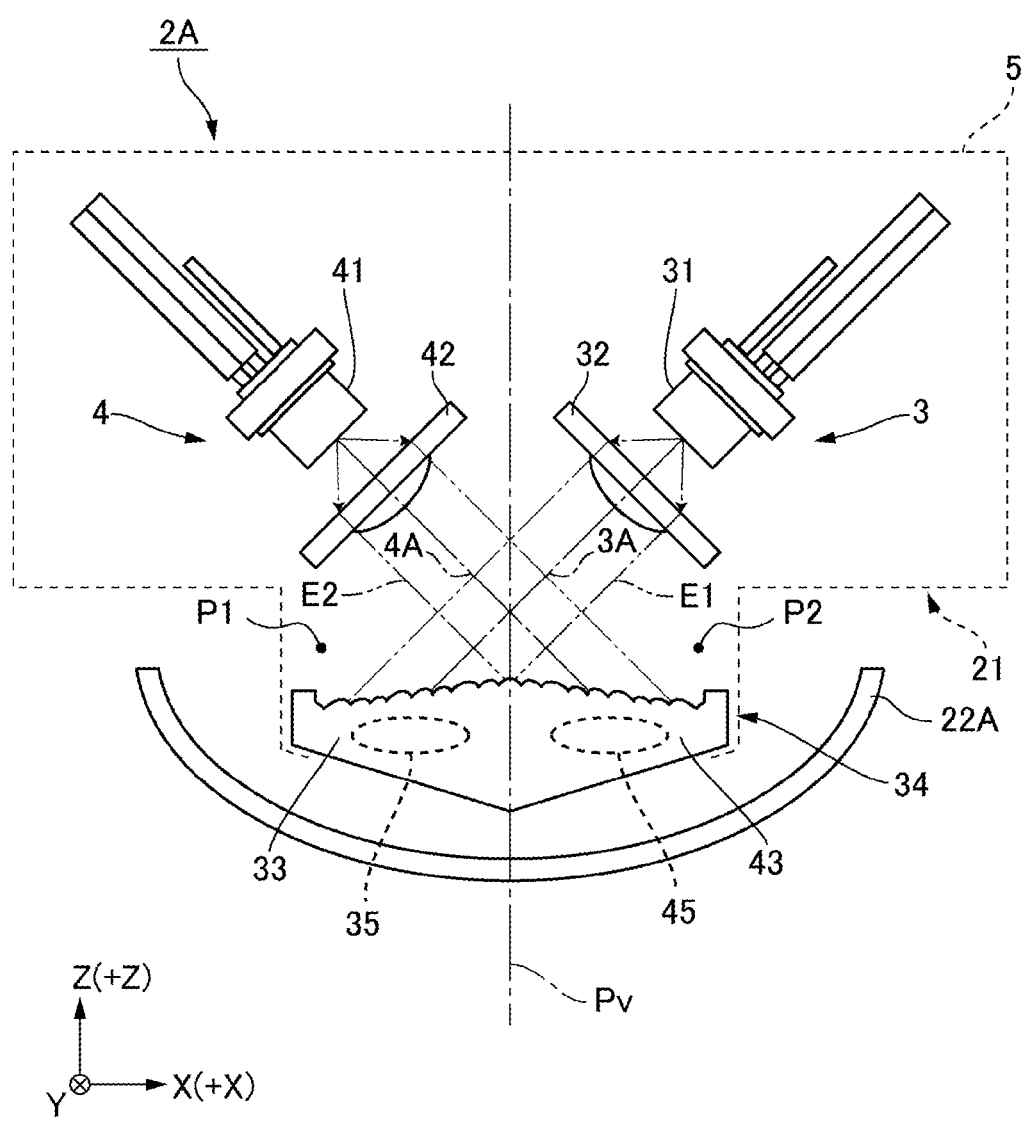
FIG. 11 is a schematic diagram showing a schematic configuration of a light emitting device according to Embodiment 2.

FIG. 11 is a schematic diagram showing a schematic configuration of a light emitting device 2A according to Embodiment 2. The light emitting device 2A according to Embodiment 2 is configured similarly to that of Embodiment 1 except a shape of a cover lens 22A. Therefore, the same constituents are denoted by the same reference numerals, and the description thereof will be omitted. Further, the application to the image display system is also substantially the same as in the case of Embodiment 1, and therefore the description thereof will be omitted.

The cover lens 22A in Embodiment 2 has an elliptical arc shape when viewed from the front-back direction Y. The cover lens 22A is arranged so that the long axis direction and the right-left direction X coincide with each other, and cover lens 22A has symmetry about the virtual center plane Pv. The curvature centers P1, P2 of the cover lens 22A are different in position from the first diffusion center 35 and the second diffusion center 45 when viewed from the front-back direction Y similarly to Embodiment 1. In other words, the cover lens 22A is eccentrically disposed with respect to the first diffusion center 35 and the second diffusion center 45. Therefore, similarly to Embodiment 1, by tilting the cover lens 22A around the second axis L2, it is possible to shorten the distance between the projection surface SC and the light curtain LC in the direction toward the right and left end parts at the upper end of the projection surface SC also in the upper part of the projection surface SC. Therefore, it is possible for the image display system equipped with the light emitting device 2A according to Embodiment 2 to improve the operability of the touch operation in the upper part of the projection surface SC.

Modified Examples of Embodiments 1, 2

(1) Although the Powell lenses are used as the first lens 33 and the second lens 43 in Embodiments 1, 2, it is also possible to use other directional lenses. It is also possible to use, for example, cylindrical lenses. Further, although there are used the lens arrays each having the small lenses arranged in an array in Embodiments 1, 2, it is also possible to use a single lens.

(2) Although the first lens 33 and the second lens 43 are provided to the lens body 34 as a single member in Embodiments 1, 2, it is also possible to form the first lens 33 and the second lens 43 as separate members.

(3) Although the first optical axis 3A and the second optical axis 4A cross each other in the anterior stage of the light path of each of the first lens 33 and the second lens 43 in Embodiments 1, 2, it is also possible to configure the first light emitter 3 and the second light emitter 4 so that the first optical axis 3A and the second optical axis 4A do not cross each other.

(4) Although the first light emitter 3 and the second light emitter 4 are provided to diffuse the light from the two light sources to thereby form the light curtain LC in Embodiments 1, 2, the number of light sources can also be other than 2. For example, when setting the number of light sources to 1, it is possible to adopt a configuration in which a light source, a collimator, an lens and a cover lens are provided, the collimator substantially collimates the light emitted from the light source with respect to the optical axis of the light source, the lens makes first light emitted from the collimator wide-angle with respect to a first direction different from the optical axis of the light source from a first diffusion center as a starting point, the cover lens is disposed downstream of the lens, and the curvature center of the cover lens is different in position from the first diffusion center when viewed from a direction perpendicular to the optical axis of the light source and the first direction, as the configuration of the light emitting device. In this case, the cover lens can have a circular arc shape, or can also have an elliptical arc shape.

Third Embodiment

Figure 12:
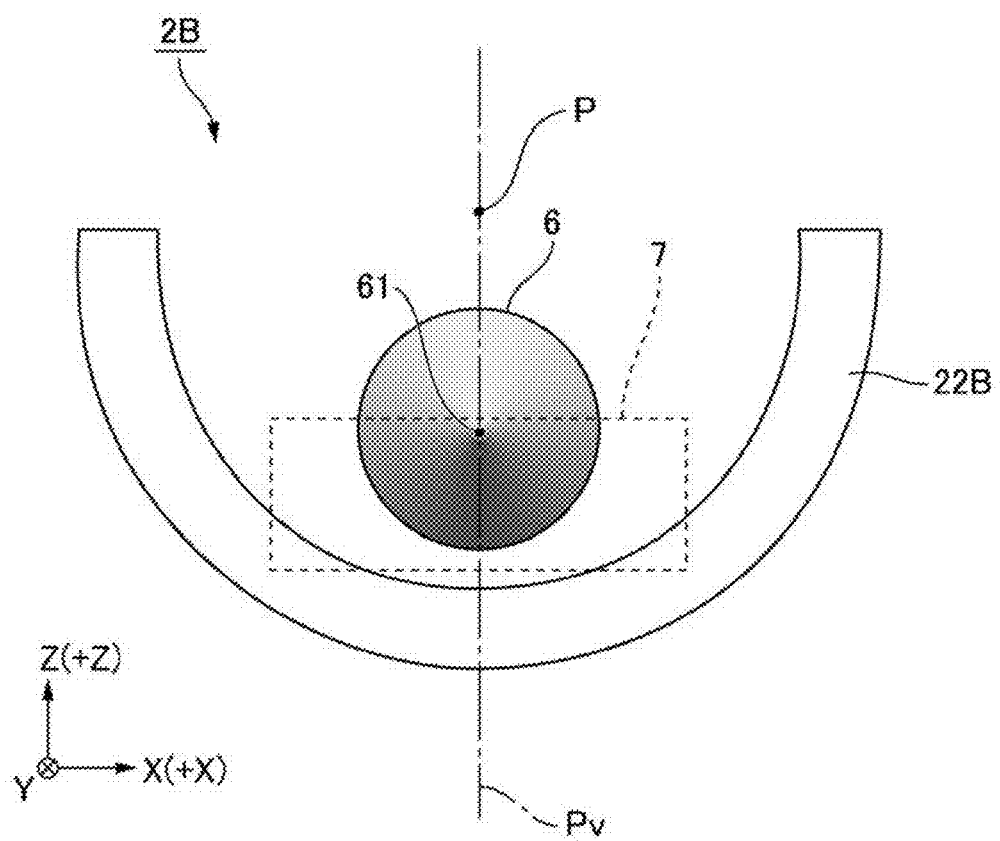
FIG. 12 is a schematic diagram showing a schematic configuration of a light emitting device according to Embodiment 3.

FIG. 12 is a schematic diagram showing a schematic configuration of a light emitting device 2B according to Embodiment 3. The light emitting device 2B according to Embodiment 3 is provided with a conical mirror 6 as the lens. The conical mirror 6 is arranged with the vertex 61 facing to an opposite side (toward the −Y direction) to the projection surface SC. A light emitter 7 is disposed on the vertex 61 side of the conical mirror 6. An optical axis direction of the light emitter 7 is a direction along the front-back direction Y. The conical mirror 6 diffuses first light, which has entered the conical surface from the light emitter 7, in the right-left direction X to emit the first light downward to form the light curtain LC. The conical mirror 6 is covered with the cover lens 22B having a circular arc shape from below. The cover lens 22B is supported so as to be able to rotate around the second axis L2 substantially parallel to the right-left direction X. It should be noted that the cover lens 22B can have an elliptical arc shape instead of the circular arc shape.

In Embodiment 3, the lens for making the light wide-angle is the conical mirror 6, and the diffusion center of the first light to be made wide-angle by the conical mirror 6 is located on a center line passing through the vertex 61 of the conical mirror 6. The curvature center P of the cover lens 22B is different in position from the vertex 61 of the conical mirror 6 when viewed from the front-back direction Y. In other words, the cover lens 22B is eccentrically disposed with respect to the diffusion center of the first light made wide-angle by the conical mirror 6. Therefore, similarly to Embodiments 1, 2, by tilting the cover lens 22B around the second axis L2, it is possible to shorten the distance between the projection surface SC and the light curtain LC in the direction toward the right and left end parts at the upper end of the projection surface SC.

Other Embodiments

The present disclosure is not limited to the embodiments described above, but can be implemented in a variety of aspects within the scope or the spirit of the present disclosure. For example, although the image display system 100 according to each of the embodiments described above is a system for projecting the image light GL on the projection surface SC with the projector 1, it is sufficient for the projection surface SC to be a display surface for displaying an image. For example, it is also possible to adopt a configuration of covering the display surface such as a liquid crystal display or an organic EL display with the light curtain formed by the light emitting device.

What is claimed is:
1. A light emitting device comprising:
a light source;
a collimator configured to substantially collimate light emitted from the light source with respect to an optical axis of the light source;
an lens configured to make first light emitted from the collimator wide-angle with respect to a first direction different from the optical axis from a first diffusion center as a starting point; and
a cover lens having a curved surface shape and disposed downstream of the lens, wherein
a curvature center of the cover lens is different in position from the first diffusion center when viewed from a direction perpendicular to the optical axis and the first direction, and
the cover lens is tilted with respect to a plane including the optical axis.
2. The light emitting device according to claim 1, wherein the cover lens has one of a circular arc shape and an elliptical arc shape when viewed from the direction perpendicular to the optical axis and the first direction.
3. The light emitting device according to claim 1, wherein the cover lens rotates around a rotational axis line substantially parallel to the first direction.
4. The light emitting device according to claim 1, wherein the lens is a directional lens.
5. The light emitting device according to claim 4, wherein the lens includes a plurality of small lenses, and
the small lenses are each the directional lens.
6. The light emitting device according to claim 1, wherein the lens is a conical mirror.
7. An image display system comprising:
the light emitting device according to claim 1;
a imager configured to detect a reflection position of light emitted from the light emitting device;
a projection surface; and
a projection device configured to project an image corresponding to a detection result detected by the imager on the projection surface.
8. The image display system according to claim 7, wherein
the cover lens is tilted toward a direction of changing an emission direction of the light emitted from the light emitting device toward the projection surface.
9. An image display system comprising:
the light emitting device according to claim 2;
a imager configured to detect a reflection position of light emitted from the light emitting device;
a projection surface; and
a projection device configured to project an image corresponding to a detection result detected by the imager on the projection surface.
10. An image display system comprising:
the light emitting device according to claim 3;
a imager configured to detect a reflection position of light emitted from the light emitting device;
a projection surface; and
a projection device configured to project an image corresponding to a detection result detected by the imager on the projection surface.
11. A light emitting device comprising:
a first light source;
a first collimator configured to substantially collimate light emitted from the first light source with respect to a first optical axis as an optical axis of the first light source;
a second light source;
a second collimator configured to substantially collimate light emitted from the second light source with respect to a second optical axis as an optical axis of the second light source;
an lens configured to make first light emitted from the first collimator and second light emitted form the second collimator wide-angle with respect to a first direction different from both of the first optical axis and the second optical axis; and
a cover lens having a curved surface shape and disposed downstream of the lens, wherein
the lens makes the first light wide-angle in the first direction from a first diffusion center as a starting point, and makes the second light wide-angle in the first direction from a second diffusion center as a starting point,
a curvature center of the cover lens is different in position from both of the first diffusion center and the second diffusion center when viewed from a direction perpendicular to the first optical axis and the second optical axis, and
the cover lens is tilted with respect to a plane including the first optical axis and the second optical axis.
12. The light emitting device according to claim 11, wherein
the cover lens has one of a circular arc shape and an elliptical arc shape when viewed from a direction perpendicular to the first optical axis, the second optical axis and the first direction.
13. The light emitting device according to claim 11, wherein
the cover lens rotates around a rotational axis line substantially parallel to the first direction.
14. The light emitting device according to claim 11, wherein
the lens is a directional lens.
15. The light emitting device according to claim 14, wherein
the lens includes a plurality of small lenses, and
the small lenses are each the directional lens.
16. The light emitting device according to claim 11, wherein
the lens is a conical mirror.
17. An image display system comprising:
the light emitting device according to claim 11;
a imager configured to detect a reflection position of light emitted from the light emitting device;
a projection surface; and
a projection device configured to project an image corresponding to a detection result detected by the imager on the projection surface.
18. The image display system according to claim 17, wherein
the cover lens is tilted toward a direction of changing an emission direction of the light emitted from the light emitting device toward the projection surface.
19. An image display system comprising:
the light emitting device according to claim 12;
a imager configured to detect a reflection position of light emitted from the light emitting device;
a projection surface; and a projection device configured to project an image corresponding to a detection result detected by the imager on the projection surface.

20. An image display system comprising:

the light emitting device according to claim 13;

a imager configured to detect a reflection position of light emitted from the light emitting device;

a projection surface; and a projection device configured to project an image corresponding to a detection result detected by the imager on the projection surface.

\* \* \* \* \*